Oct. 20, 1970        R. A. HORVATH        3,534,615
DUAL FLYWHEEL ACCELEROMETER SENSING AND CONTROLLING UNIT
Original Filed Oct. 11, 1967        3 Sheets-Sheet 3
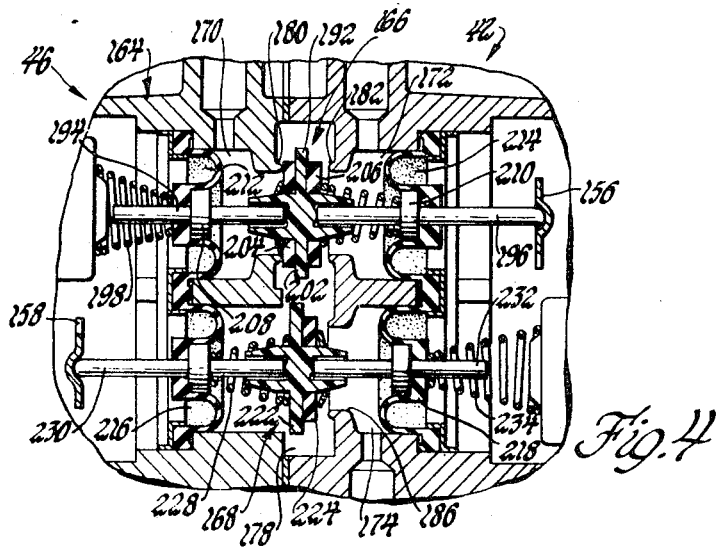
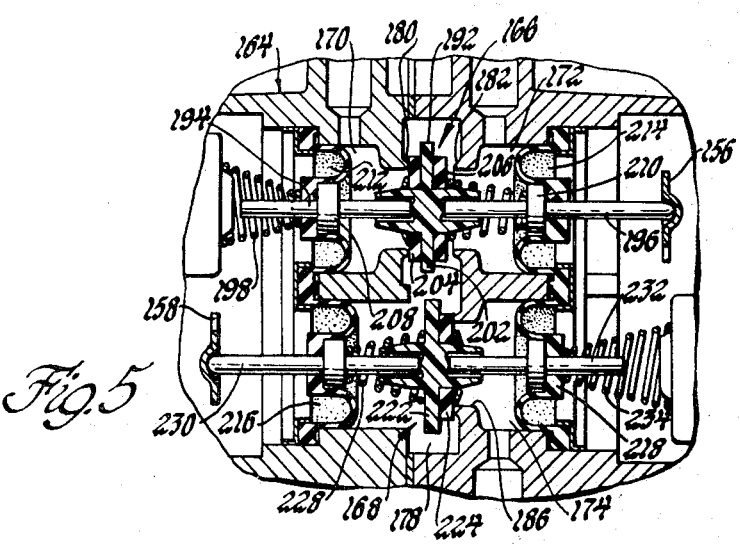
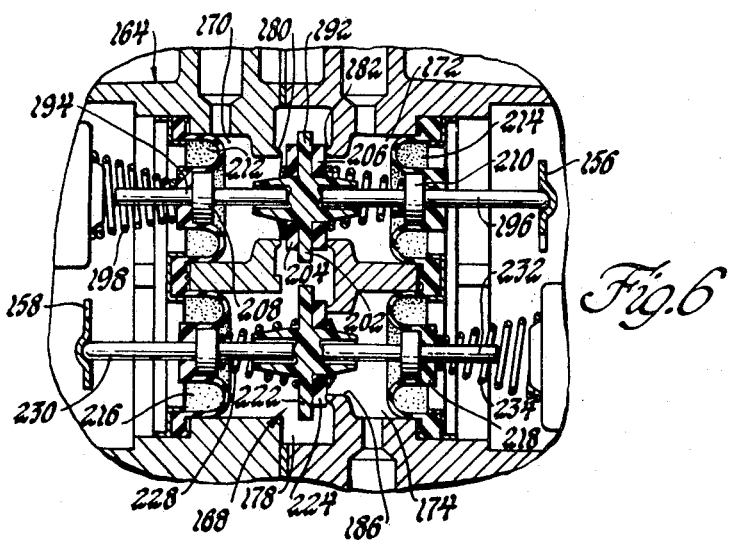
INVENTOR.
Robert A. Horvath
BY
D. D. McGraw
ATTORNEY

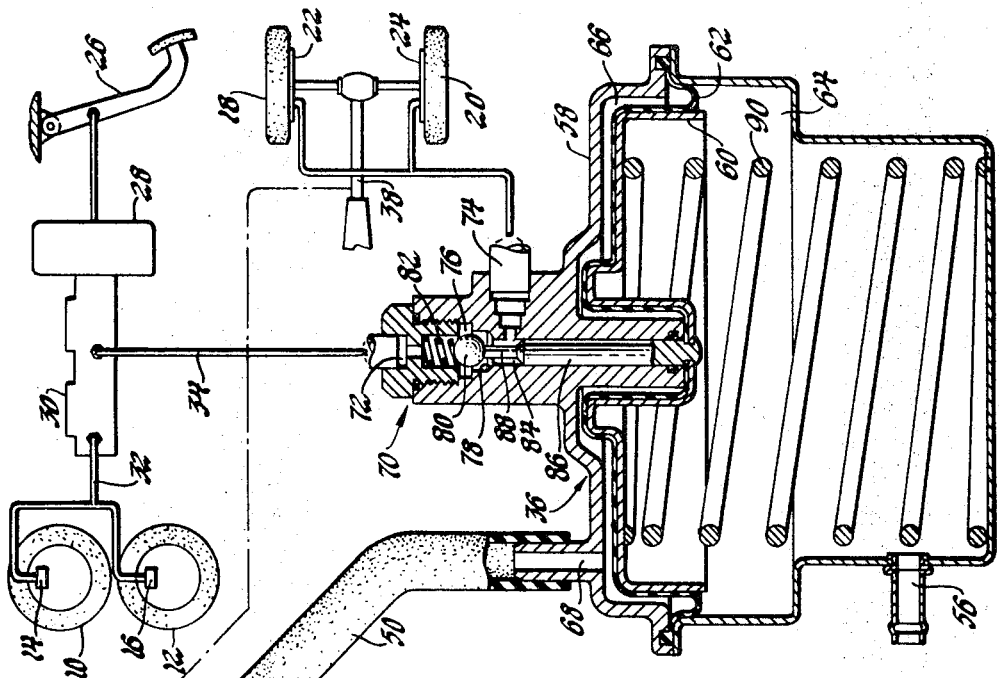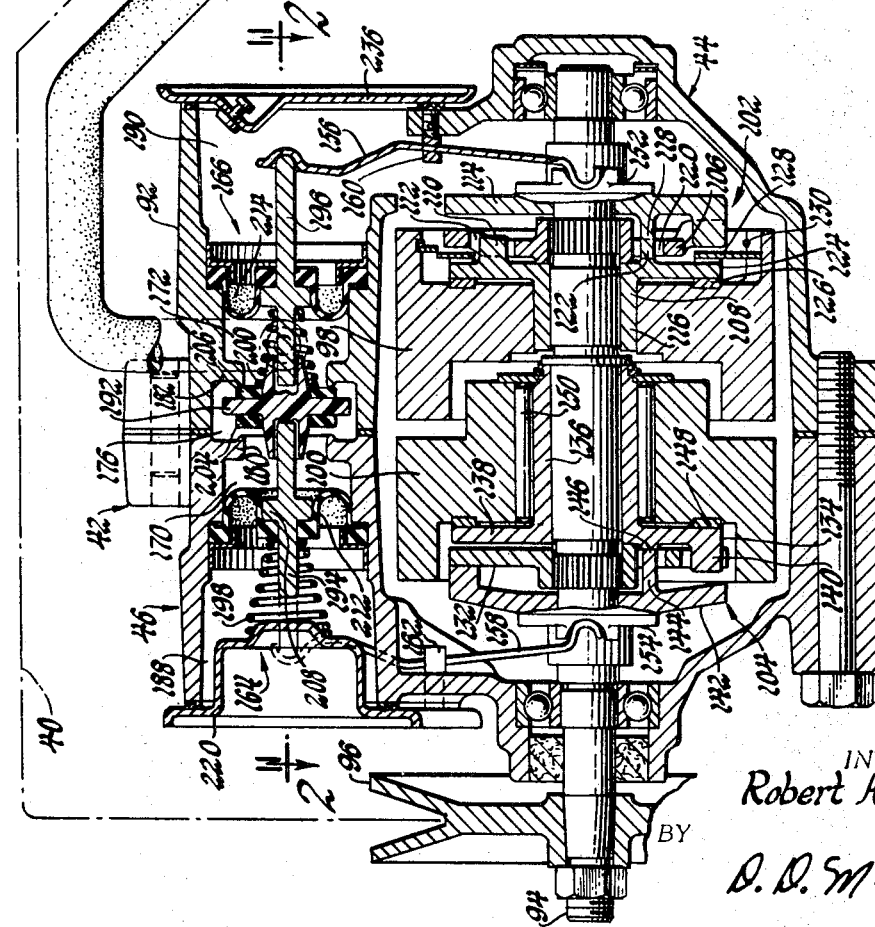

United States Patent Office 3,534,615
Patented Oct. 20, 1970

3,534,615
DUAL FLYWHEEL ACCELEROMETER SENSING AND CONTROLLING UNIT
Robert A. Horvath, Dayton, Ohio, assignor to General Motors Corporation, Detroit, Mich., a corporation of Delaware
Original application Oct. 11, 1967, Ser. No. 674,389, now Patent No. 3,433,535, dated Mar. 18, 1969. Divided and this application Aug. 19, 1968, Ser. No. 753,442
Int. Cl. G01p 15/02
U.S. Cl. 73—510                              4 Claims

ABSTRACT OF THE DISCLOSURE

A vehicle wheel brake system utilizes two wheel acceleration sensors to develop control signals from wheel accelerations and decelerations to control a brake apply pressure modulator so as to cycle the pressures provided at the wheel brake to obtain a maximum braking effect without permitting the wheel slip to approach a full lock condition. One sensor is actuated, upon braking of the wheel which is sufficient to cause substantially increasing wheel slip, to develop a control signal causing the modulator to release the brake pressure applied to the wheel brake to permit the wheel to accelerate toward a rolling condition, with consequent decreasing wheel slip. The other sensor is actuated by this wheel acceleration to develop a control signal causing the modulator to retain the applied pressure at a value which still exerts a braking effort while permitting wheel acceleration to continue, and therefore wheel slip to continue to decrease, until wheel acceleration substantially ceases by reason of the wheel returning approximately to a true rolling condition. Meanwhile the one sensor establishes a condition upon the wheel acceleration which will permit the full available brake pressure to again be applied upon further action of the other sensor. When the wheel acceleration substantially ceases, the other sensor further acts to condition the modulator, and the full available brake pressure is again permitted to be applied to the wheel brake to cause wheel deceleration. The cycle is repeated as necessary so long as the wheel acceleration and deceleration require that action.

---

This is a division of Ser. No. 674,389, filed Oct., 11, 1967, now Pat. No. 3,433,535.

The invention relates to an accelerometer sensing and controlling unit for a brake system and more particularly to such a unit employed in combination with a vehicle wheel brake arrangement. A vehicle wheel can be braked to such an extent that the effective braking force between the wheel and the road surface decreases even though the braking pressure applied to the wheel brake does not. This occurs when the wheel slip ratio increases sufficiently. If allowed to continue, the vehicle wheel brake will lock so that the wheel slides on the road surface instead of rotating. It is advantageous to maintain the wheel in a rolling condition as the vehicle decelerates in relation to the road surface rather than a sliding condition. In this context, a partial slipping condition is considered to be part of a rolling condition of operation. The mechanism embodying the invention particularly relates to the sensing and controlling portion of the system so that the system utilizes the acceleration and deceleration characteristics of the wheel or wheels being braked and controlled to operate a brake pressure modulator to provide an extremal type of control. The brake apply pressure, and therefore the wheel brake applying force, is caused to cycle in accordance with conditions existing at the vehicle wheel or wheels being sensed so that the wheel is not permitted to be decelerated beyond a predetermined rate which would result in such an increase in wheel slip as to substantially lessen the retarding force or torque exerted between the wheel and the road surface. A typical system cycle of operation is a brake apply, followed by a brake release to a lesser value, followed by a brake hold, followed by another brake apply. The sensing and controlling mechanism senses the changes taking place which affect the brake retarding force so as to maintain a high average retarding force throughout the entire braking operation, such high average retarding force being considerably greater than the retarding force obtainable with the sensed and controlled vehicle wheel or wheels locked against rotation while the vehicle is moving. The disclosed mechanism embodying the invention uses a multiple signal sensing and generating unit having an inertia actuation section and a control valve section. The inertia actuation section functions to sense positive and negative wheel accelerations and positions the valves in the valve section accordingly. The valves control differential pressures acting on the brake pressure modulator, which in turn controls the brake apply pressure to the wheel brake. The inertia actuation section has a shaft driven by one or more vehicle wheels to be sensed and controlled. This shaft drives two inertia responsive members, one of which initially acts at a predetermined wheel deceleration indicative of an increasing wheel slip occurring concurrently with the decreasing wheel retarding force. This actuation causes the valve section to send a signal to the modulator, which acts to release the brake pressure to a lesser value. As the wheel changes to a positive acceleration due to the decreased braking force applied, the other inertia responsive member is actuated to cause the valve section to control the modulator to prevent further release of the brake pressure applied to the wheel brake. It therefore establishes a brake hold condition in which the wheel brake receives pressure sufficient to continue braking action but insufficient to cause the wheel to decelerate. In this condition of operation the wheel accelerates toward a pure rolling condition of operation with a consequent decrease in wheel slip. The first inertia responsive member senses the vehicle wheel acceleration and conditions the valve section so that a signal can be sent to the modulator upon further actuation of the second inertia responsive member to permit brake pressure from the brake pressure source to be reapplied to the wheel brake. The further actuation of the second inertia responsive member occurs when wheel acceleration substantially ceases as the wheel approaches a true rolling condition. While the system is shown as being installed to control the rear wheel brakes of a vehicle, with wheel accelerations and decelerations being sensed by driving the inertia actuation section from the vehicle drive shaft, the system can be utilized in other wheel brake combinations. It is feasible to utilize a complete system for each vehicle wheel brake if desired, to use one system for the front wheel brakes and another system for the rear wheel brakes, one system for each front wheel brake and a third system for the rear wheel brakes, or any other desired combination of wheel brakes and systems. While the invention is disclosed as a mechanical sensor and signal generator, the invention may also be practiced by use of other types of sensing mechanisms. The sensors may be electrical, pneumatic, or hydraulic, or a combination thereof. Likewise, the signal controls, herein disclosed as valves, may be electrical, or hydraulic in nature. The type of vehicle braking system in which the invention is utilized may be other than hydraulic, such as positive air pressure, electrical, or electromagnetic in nature. It is only in its more specific aspects, as more particularly disclosed and claimed herein, that the invention applies to a mechanical accelerometer sensing unit and differential pressure control valves which produce modulator controlling signals by valve position.

In the drawings:

FIG. 1 is a schematic illustration of a system having mechanism therein embodying the invention, with parts broken away and in section;

FIG. 4 is a partial section view similar to FIG. 2 showing the valves in the position corresponding to times $T_2$ to $T_3$ of FIG. 3;

FIG. 5 is a partial section view similar to FIG. 2 showing the valves in the position corresponding to times $T_3$ to $T_4$ of FIG. 3; and FIG. 6 is a partial section view similar to FIG. 2 showing the valves in the position corresponding to times $T_4$ to $T_5$ of FIG. 3.

Figure 2:
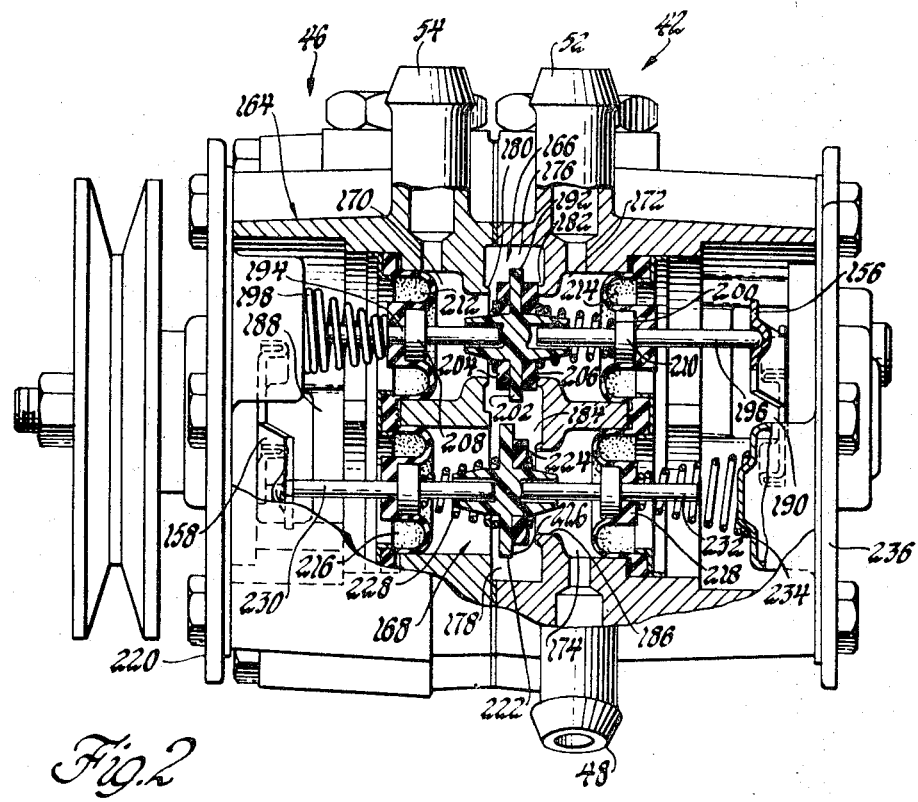
FIG. 2 is a view of the control valve section of the mechanism of FIG. 1 embodying the invention, taken in the direction of arrows 2—2 of that figure, and having parts broken away and in section. The position of the valves in this figure are correlated with the condition graphically illustrated in FIG. 3 from time $T_1$ to time $T_2$.

The vehicle braking system shown in FIG. 1 includes front wheels 10 and 12 respectively provided with front wheel brakes 14 and 16, rear wheels 18 and 20 respectively provided with rear wheel brakes 22 and 24, and a brake pedal 26 connected to operate the brake booster 28, which in turn operates a dual chamber master cylinder 30. In the system illustrated, the front pressurizing chamber of the master cylinder is connected by conduit means 32 to the front wheel brakes 14 and 16, and the rear pressurizing chamber is connected by conduit means 34 to the rear wheel brakes 22 and 24. A brake apply pressure modulator 36 is fluid connected in the conduit means 34 so that it can modify the brake apply pressure furnished by the master cylinder 30 to the rear wheel brakes 22 and 24. In this system both rear wheel brakes are to be controlled by one sensor unit and one modulator. If desired, however, separate sensor units and modulators can be provided for each rear wheel brake. In order to use one sensor unit for both rear wheels, the sensor unit is driven from the rear wheel drive shaft 38 through a suitable connection schematically illustrated by the dashed line 40.

The sensing and controlling unit 42 has an inertia actuation section 44 and a valve section 46. The valve section has a control pressure outlet 48 fluid connected by conduit 50 to the modulator 36. The valve section and the modulator are disclosed as operating with differential pressures, one of which is atmospheric air pressure provided through valve section inlet 52 and the other of which is a vacuum pressure provided through inlet 54. The vacuum pressure may be obtained from a suitable source of vacuum such as the vehicle engine intake manifold. The vacuum source is also connected to the modulator 36 through vacuum inlet 56.

The modulator 36 has a housing 58 in which a power piston 60 and a diaphragm 62 are positioned to provide a power wall which divides the housing into a vacuum chamber 64 and a variable pressure chamber 66. The vacuum chamber 64 is connected to the vacuum inlet 56 and therefore to the source of vacuum. The variable pressure chamber 66 is connected to the conduit 50 through the control pressure inlet 68. The modulator housing 58 has a brake apply pressure control section 70 provided with a brake apply pressure inlet 72 and a brake apply pressure outlet 74. The control section 70 has a valve chamber 76 formed to provide a valve seat 78 and to contain valve 80 so that when the valve is seated on seat 78, no brake apply pressure or brake fluid can be transmitted from inlet 72 to outlet 74. When the valve is unseated, there is free fluid flow between the inlet and the outlet. Valve 80 is urged toward its seat by valve spring 82 with the valve being on the side of the seat toward inlet 72. A passage 84, formed to connect with chamber 76 through the valve seat 78, contains a rod-like piston 86, which is connected at one end with the power piston 60 and has a pin-like end 88 extending into engagement with the valve 80 so that the piston opposes the force of the valve spring 82. Thus when the power piston 60 is moved to the position shown in FIG. 1 by the power piston return spring 90, the piston 86 is in the upward position holding the valve 80 off seat 78 and fluid connecting the inlet 72 with the outlet 74. Therefore any brake apply pressure generated by the master cylinder 30 in the conduit 34 is transmitted to the rear wheel brakes 22 and 24. This is the normal position of the modulator power piston when the pressures on opposite sides of the diaphragm 62 are substantially the same, whether they be atmospheric pressure because of the lack of a vacuum source due to the vehicle engine not running or vacuum from the vacuum source entering inlets 56 and 68. When the control pressure transmitted from the sensor unit through conduit 50 and inlet 68 is changed to some intermediate pressure value, as will be described, the absolute pressure increases in chamber 66 and when sufficient overcomes the force of return spring 90 and moves the power piston downwardly. This also moves piston 86 downwardly, allowing valve spring 82 to seat valve 80 on the valve seat 78, thereby preventing brake apply pressure from the master cylinder from being transmitted to the rear wheel brakes. Further downward movement of the power piston 60 and piston 86 increases the volume of the upper end of passage 84 which is fluid connected to the outlet 74, thereby decreasing the brake apply pressure to the rear wheel brakes 22 and 24. This brake apply pressure is therefore released to a lower pressure level depending upon the stroke of piston 86, and is held substantially at that lower level when the power piston 60 is held at some intermediate position due to the balancing of forces across the piston and diaphragm exerted by the differential pressures acting thereon and return spring 90. When vacuum is reapplied to chamber 66, the power piston 60 and the piston 86 move upwardly, unseating valve 80 and again permitting the master cylinder generated pressure to be applied to the rear wheel brakes.

The sensor unit 42 has a housing 92 containing the inertia actuation section 44 and the valve section 46. The inertia actuation section includes a drive shaft 94 which is suitably driven by the vehicle drive shaft 38 when one sensor unit is utilized to control both driving wheels 18 and 20. It is contemplated that the drive shaft 94 may be driven by any wheel or group of wheels to be controlled by one modulator. A drive pulley 96 is illustrated as providing a suitable means for driving the shaft through a belt drive arrangement. However, other drive arrangements may be made.

Inertia responsive members 98 and 100, herein shown as flywheels, are rotatably mounted on the shaft 94 and are arranged to be driven through respective drive assemblies 102 and 104. The drive assembly 102 includes a driver 106 which is secured to the shaft 94 by suitable means such as splines, a torque drum or driven member 108 having a projection 110 extending into an arcuate opening 112 formed in the driver 106, and a cam member 114 rotatably mounted on the shaft 94 so as to have the capability of moving axially and rotatably relative to the shaft. The torque drum 108 has a cylindrical section 116 which fits rotatably about shaft 94 and on which the flywheel 98 is rotatably mounted so that the cylindrical section 116 is positioned radially inward of the flywheel 98 between the flywheel and the drive shaft 94. The cam member 114 has tangs 118 extending through suitable openings 120 in the driver 106 so as to engage camming surfaces 122 formed on the torque drum 108. The torque drum has a flange section 124 on which the camming surfaces 122 are formed. A suitable number of cam tangs and torque drum camming surfaces may be provided in a circumferentially-spaced manner. The torque drum flange section 124 extends outwardly beyond the camming surfaces and is engageable on its opposite sides by an inner clutch plate assembly 126 and an outer clutch plate assembly 128. The clutch plate assemblies are suitably connected to the flywheel 98 and retained in position by a retainer 130. The outer clutch plate assembly 128 may be so constructed as to provide a spring force urging the clutch plate assemblies and the torque drum flange into clutching engagement.

The drive assembly 104 is generally similar to drive assembly 102, with a slightly different clutch arrangement being illustrated. The drive assembly includes the driver 132 spline connected to the drive shaft 94, the driven member 134, which is a torque drum, and includes a cylindrical section 136 and a flange section 138. The projection 140 is arranged so that driver 132 can drive the torque drum 134. The cam member 142 is positioned so that its cam tangs 144 engage the camming surfaces 146 formed on the torque drum flange 138 in a manner similar to the cam arrangement of drive assembly 102. The torque drum flange 138 engages a clutch and bearing plate 148 provided on the flywheel 100. The flywheel 100 is mounted so as to be rotatable on the cylindrical portion 136 of the torque drum 134, and a sprag clutch 150 is preferably provided between the flywheel and the cylindrical portion 136 to permit the clutch to drive the flywheel during vehicle wheel deceleration but allowing the flywheel to overrun the torque drum during vehicle wheel acceleration.

Pivot guides 152 and 154 fit over shaft 94 respectively adjacent cam members 114 and 142 so that movement of cam 114, for example, away from flywheel 98 will cause the guide 152 to slide on the shaft 94. Similarly, guide 154 will slide on the shaft 94 when cam member 142 moves outwardly. The guides do not rotate with the shaft or the cam members and are respectively positioned by the levers 156 and 158. These levers are pivotally attached to the housing 92 by pivots 160 and 162, respectively. The lower ends of the levers are forked so that they fit around the shaft 94 and are provided with curved end sections which fit in mating recesses on the guides 152 and 154 somewhat like a ball and socket arrangement. Thus movement of a guide axially of shaft 94 causes pivotal movement of the lever associated therewith. The upper ends of the levers extend into the valve section 46 so that they can actuate valves associated therewith in the below described manner.

The valve section 46 includes portions of the housing 92 and a valve assembly 164 comprised of valve units 166 and 168. The housing is formed to provide a vacuum inlet chamber 170 to which the vacuum inlet 54 is connected, an atmospheric pressure inlet chamber 172 to which the atmospheric air inlet 52 is connected, an outlet pressure chamber 174 to which the outlet 48 is connected, a release valve chamber 176, and a hold valve chamber 178. Chamber 176 is positioned between chambers 170 and 172 and the housing is formed to provide annular valve seats 180 and 182 in spaced aligned relation, the openings therethrough connecting chambers 170 and 172 with chamber 176. A passage 184 connects chamber 166 and chamber 178. An annular valve seat 186 is formed as a part of the housing intermediate chambers 174 and 178 so that the opening therethrough connects those chambers. Outer chambers 188 and 190 are positioned outwardly of the other chambers and contain levers 158 and 156, respectively.

The valve unit 166 includes the valve seats 180 and 182, a valve 192 positioned in chamber 176 and mounted on valve rods 194 and 196, and valve springs 198 and 200. The valve 192 has a body 202 on which oppositely disposed valve faces 204 and 206 are provided. The adjacent ends of valve rods 194 and 196 extend into oppositely disposed recesses in the valve body. The valve rods have enlarged center sections 208 and 210 which fit in sealing diaphragm sections 212 and 214, respectively. These diaphragm sections are part of diaphragm assemblies which fit in the housing to sealingly separate the outer chambers from the various inner chambers. Thus diaphragm section 212 sealingly separates outer chamber 188 and the vacuum inlet chamber 170, and diaphragm section 214 sealingly separates outer chamber 190 and atmospheric inlet chamber 172. Diaphragm sections 216 and 218 similarly separate chambers 188 and 178 from chambers 190 and 174, respectively. Valve spring 200 is positioned between the valve 192 and the push rod section 210 of rod 196 so that the valve and the valve rod are urged axially apart. This has the effect of firmly seating valve rod 194 in its valve body recess, with a slight lost motion spacing between the base of the valve body recess in which rod 196 is received. Valve spring 198 seats against a portion of the diaphragm section 212 supported by the enlarged center section 208 of rod 194 and also seats against the cover 220 which closes the outer side of outer chamber 188. Spring 198 urges the valve rod 194 and the valve 192 to the right, as seen in FIGS. 1 and 2, so that the normal position of the valve is that in which the valve face 206 seats in sealing relation against valve seat 182 and valve face 204 is spaced from valve seat 180. Thus the vacuum inlet 54 is connected through chamber 170 to passage 184 and chamber 178. The outer end of valve rod 196 fits within a socket formed within the upper end of lever 156 so that pivotal movement of the lever will result in axial movement of the valve rod.

The valve unit 168 is similarly constructed. However, the valve 222 requires only one valve face 224. This valve face is on the side of the valve body 226 toward valve seat 186. The valve spring 228 is positioned similarly to spring 200 of valve unit 166 but is on the side of the valve having no valve face. Valve rod 230 is engaged by one end of spring 228. Valve rod 230 also engages the upper end of lever 158 so that the valve may be moved axially by pivotal movement of that lever. The valve rod 232 extends through chamber 174. Valve spring 234 is positioned about the outer end of the rod and engages the diaphragm section 218, which is backed up by the enlarged center section of rod 232, and the cover 236 which closes outer chamber 190. Thus spring 234 urges the valve 222 in a position away from seat 186 so that valve face 224 is spaced therefrom and chamber 174 is fluid connected with passage 184 and chamber 178. Thus when the valves are in the position shown in FIG. 2, vacuum from the vacuum source is supplied through inlet 54 to outlet 48 and atmospheric air pressure is cut off at seat 182. Therefore vacuum is supplied to the modulator chamber 66 and valve 80 is unseated so that brake pressure moves freely between the master cylinder 30 and the wheel brakes 22 and 24. This is the normal condition of the system when there is no incipient wheel locking condition existing. Thus the brake system is allowed to operate in an entirely normal manner until conditions occur which cause actuation of the sensing and controlling mechanism.

FIG. 4 shows the valve assembly in the condition wherein flywheel 98 has sensed undue vehicle wheel negative acceleration portending a wheel locking condition and has acted through the cam arrangement to move cam member 114 in an axial direction on shaft 94 to cause lever 156 to pivot about pivot 160, thereby moving the valve 192 to the left to unseat the valve face 206 from the valve seat 182 and then to seat the valve face 204 against the valve seat 180. This has the immediate effect of cutting off the vacuum supply and opening the atmospheric air supply so that atmospheric air pressure passes from chamber 172 through chamber 176, passage 184, chamber 178 and chamber 174 to the control pressure outlet 48 and thence to the modulator variable pressure chamber 66. This control pressure will be greater than the vacuum supply and less than the atmospheric air supply but will increase in absolute pressure value until the modulator piston is moved downwardly and valve 80 of the modulator seats on seat 78 to cut off brake pressure generated in the master cylinder from the wheel brakes 22 and 24.

Figure 3:
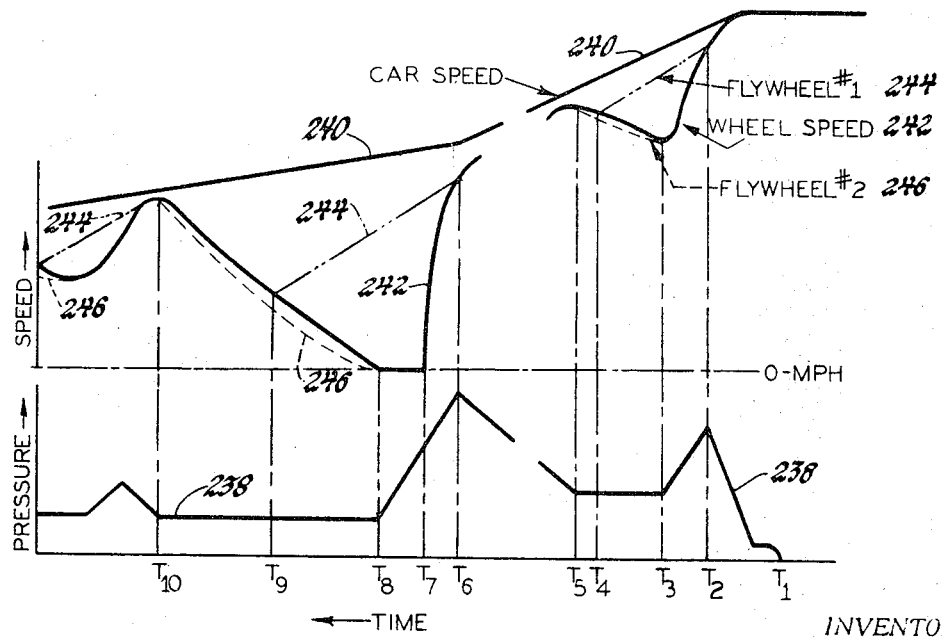
FIG. 3 is a graphic illustration of the car speed, inertia responsive member speeds, wheel speed, and pressures applied to the wheel brake, through cycles of operation under two different braking conditions.

FIG. 3 includes a graphic representation of occurrences taking place as the system passes through an operational cycle. The curve 238 illustrates the brake apply pressure at the wheel brakes 22 and 24. The curve 240 illustrates vehicle road speed. The curve 242 illustrates the speed of the vehicle wheel or wheels being braked and controlled. The slope of curve 242 is indicative of the acceleration and deceleration phases through which the wheel passes. Curve 244 branches off from curve 242 and illustrates the speed of flywheel 98 as it overruns the wheel speed and therefore the rotational speed of drive shaft 94. Curve 246 illustrates the speed of flywheel 100 as it accelerates somewhat more slowly than does the wheel when the brake pressure has been released under control of the system. The portions of these curves from times $T_1$ through $T_5$ show a typical cycle. The valve assembly is in the condition shown in FIG. 2 during time $T_1$ to $T_2$. At time $T_2$ the flywheel 98, tending to maintain its speed and deceleration at a slower rate than shaft 94, the speed of which is a function of wheel speed, overruns the shaft so that it tends to move at a higher rate of speed than does the shaft. This is clearly indicated by curve 244 in relation to curve 242. During the time that flywheel 98 is so overrunning, valve unit 166 is positioned in the position shown in FIG. 4. At time $T_3$, the brake pressure having been released to a lower value, the wheel speed begins to increase. Therefore flywheel 100 tends to be overrun by the speed of shaft 94, as indicated in comparing curves 246 and 242. This causes lever 158 to be pivoted so as to move valve 222 to the right to engage valve face 224 with seat 186. This prevents further atmospheric air pressure from entering the variable pressure chamber 66 of the modulator, thereby positioning the power piston 60 and the piston 86 in the position which establishes the lower pressure value indicated by the portion of pressure curve 238 between times $T_3$ and $T_4$. The valve assembly during this time is in the position shown in FIG. 5. The assembly maintains this condition until the speeds of flywheels 98 and 100 relative to shaft 94 are such that flywheel 98 allows cam member 114 to move to the left, pivoting lever 156 clockwise as seen in FIG. 1, and moving valve unit 166 back to the position shown in FIG. 1, and also shown in FIG. 6. Thus insofar as the release valve unit is concerned, the brake pressure may be reapplied. However, the hold valve unit 168 is still in the hold position. As the wheel speed increases so that the wheel slip is decreasing and the wheel is approaching a true rolling condition, the acceleration becomes such that flywheel 100 permits cam member 142 to move to the right as seen in FIG. 1, pivoting lever 158 counterclockwise and unseating valve face 224 from seat 186. Thus the valve assembly is returned to the position shown in FIG. 2. Vacuum from the vacuum source is again applied to chamber 66 as well as chamber 64, the power piston 60 and the piston 86 move upwardly, and valve 80 is unseated relative to seat 78 so that whatever pressure is then being generated by the master cylinder 30 in conduit 34 is transmitted to the wheel brakes 22 and 24. Thus the pressure increases, as is shown by the portion of curve 238 beyond time $T_5$, and the wheel speed again decreases. If the deceleration of the wheel is then insufficient to again actuate flywheel 98, the vehicle will stop in a normal manner. However, if the brake apply pressure and the wheel and road characteristics are such that an undesirable amount of wheel slip is again obtained, the system will again cycle in this manner, all the while decreasing car speed.

The portion of the curves in FIG. 3 from times $T_6$ through $T_{10}$ show what happens when a vehicle which is braking normally on a high coefficient road surface traverses a low coefficient surface. This can occur, for example, when braking on a paved road and encountering a patch of ice. The extremely low coefficient icy surface will permit the vehicle wheel to decelerate at an extremely fast rate. Usually this will occur so quickly that the vehicle wheel will be almost immediately locked up, as indicated by the portion of curve 242 as it drops to zero speed at time $T_7$. However, when this extremely high deceleration commences, flywheel 98 will again take the path of curve 244, causing a release of the brake apply pressure to a lower value as seen along the portion of curve 238 from time $T_6$ to time $T_8$. Since the wheel decelerated to a zero speed in this circumstance, and the low coefficient surface requires a much lesser braking effort applied before the wheel will again begin to roll and therefore accelerate, the braking pressure to which the wheel brakes are released is much lower than otherwise. However, when this pressure is sufficiently low to decrease the braking effort to allow the wheel to accelerate, flywheel 100 again follows curve 246 and this lower pressure is held. As the wheel accelerates, flywheel 98 again acts to condition valve unit 166 for full pressure application. When flywheel 100 also conditions valve unit 168 for full pressure application, as indicated at time $T_{10}$, brake pressure is again applied and the wheel speed again decreases. The beginning of another cycle of the system is illustrated beyond time $T_{10}$. While the car speed as indicated by curve 240 from time $T_6$ to time $T_{10}$ decreases at a slower rate than it does on a high coefficient surface, it still decreases in a more satisfactory manner than it would if the wheel were continued to be locked as at time $T_7$ to $T_8$. Also, the vehicle is under better control.

What is claimed is:

1. Mechanism for sensing acceleration and deceleration of a rotatable body and controlling a member accordingly, said mechanism comprising:

a rotatable shaft connected to the rotatable body to be driven thereby, first and second inertia responsive members independently rotatably mounted on said shaft, first and second drivers secured to and rotatable with said shaft and respectively adjacent said first and second inertia responsive members, first and second driven members rotatably mounted on said shaft and respectively engaging said first and second drivers in arcuate lost motion driving relation and respectively engaging said first and second inertia responsive members in frictional driving relation, first and second cam members independently mounted on said shaft for rotational and axial movement relative thereto, said first and second cam members being respectively associated with said first and second drivers in independent rotational driving relation and respectively engaging said first and second driven members in independent camming connection wherein said first and second cam members respectively independently rotatably drive said first and second driven members through the camming connections and are independently axially driven therethrough by said driven members when the associated said first and second drivers and said first and second driven members are independently relatively moved rotationally due to the inertia responsive members associated therewith each moving independently rotatably relative to said shaft in response to acceleration and deceleration of said rotatable body, axial movements of said first and second cam members operatively controlling a member in accordance with the accelerations and decelerations of the rotatable body.

2. The mechanism of claim 1, at least one of the frictional driving relation connections between said driven members and said inertia responsive members including a preloaded slip clutch allowing the inertia responsive member to overrun relative to the associated driven member at a predetermined inertia load.

3. The mechanism of claim 1, at least one of said inertia responsive members being mounted on a sleeve formed as a part of the driven member associated therewith and the sleeve being in turn mounted on said shaft in rotational relation thereto.

4. The mechanism of claim 3, further comprising a one-way clutch between the sleeve and the inertia responsive member mounted thereon.

References Cited
UNITED STATES PATENTS 3,237,996   3/1966   Lucien _____ 303—21

JAMES J. GILL, Primary Examiner

U.S. Cl. X.R.

73—514